United States Patent
Cwiklinski et al.

(10) Patent No.: US 7,669,362 B2
(45) Date of Patent: Mar. 2, 2010

(54) TRAP FOR CATCHING WOODLAND, GARDEN AND AGRICULTURAL INSECT PESTS AND METHOD FOR TRAPPING AND STORING WOODLAND, GARDEN AND AGRICULTURAL INSECT PESTS

(75) Inventors: Leszek Cwiklinski, Cracow (PL); Andrzej Barczyk, Wolbrom (PL)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/566,449

(22) PCT Filed: Jul. 30, 2004

(86) PCT No.: PCT/PL2004/000060

§ 371 (c)(1),
(2), (4) Date: Jan. 27, 2006

(87) PCT Pub. No.: WO2005/011374

PCT Pub. Date: Feb. 10, 2005

(65) Prior Publication Data

US 2006/0236591 A1    Oct. 26, 2006

(30) Foreign Application Priority Data

Jul. 31, 2003  (PL) .................................... 361513
Jul. 22, 2004  (PL) .................................... 369216

(51) Int. Cl.
    A01M 1/10    (2006.01)
(52) U.S. Cl. .......................................... 43/122; 43/107
(58) Field of Classification Search ................ 43/107, 43/122
    See application file for complete search history.

(56) References Cited

U.S. PATENT DOCUMENTS

| 4,642,936 | A * | 2/1987 | Jobin et al. ................. 43/122 |
| 5,274,949 | A * | 1/1994 | Beaton ........................ 43/113 |
| 5,540,011 | A   | 7/1996 | Groom et al. |
| 5,548,922 | A   | 8/1996 | Wefler |
| 6,550,181 | B1* | 4/2003 | Ray ............................ 43/107 |
| 6,625,922 | B1* | 9/2003 | Ernsberger, IV ............ 43/122 |
| 6,754,988 | B1* | 6/2004 | Downey ....................... 43/107 |
| 6,886,293 | B2* | 5/2005 | Forehand ..................... 43/122 |
| 7,082,712 | B2* | 8/2006 | Harris et al. ................ 43/122 |

(Continued)

FOREIGN PATENT DOCUMENTS

CA          1 122 406          4/1982

(Continued)

*Primary Examiner*—Kurt Rowan
(74) *Attorney, Agent, or Firm*—Brinks Hofer Gilson & Lione

(57) ABSTRACT

A trap for catching woodland, garden, and agricultural insect pests, consisting of a catching part (37) with an outlet opening, and a container (31) for storing caught pests, has a device for separating the captured pests from water and small debris. The device for separating the captured pests from water and small debris is placed between the outlet opening of the catching part and the container. The device for separating the caught pests from water and small debris has a shape of a funnel (135) having a funnel inlet covered up by a mesh (32) and an funnel outlet (36) situated outside of the container (31) for storing the caught pests. The funnel inlet is placed below the outlet opening of the catching part (37).

6 Claims, 12 Drawing Sheets

U.S. PATENT DOCUMENTS 7,100,324 B2 *    9/2006    Lenker .................. 43/107

FOREIGN PATENT DOCUMENTS

| DE | 195 31 981 | 3/1997 |
| EP | 1 334 660 | 8/2003 |
| JP | 06 007067 | 1/1994 |
| JP | 2000-324999 | 11/2000 |
| PL | 110924 | 9/1979 |
| PL | 120629 | 7/1980 |
| PL | 123 775 | 10/1981 |
| PL | 123 776 | 10/1981 |
| PL | 154 420 | 1/1988 |
| PL | 150 897 | 9/1988 |
| PL | 167 442 | 4/1993 |
| PL | 170 106 | 10/1996 |
| PL | 177 998 | 11/1996 |
| PL | 178 779 | 11/1997 |
| WO | WO 02/098218 | 12/2002 |

* cited by examiner

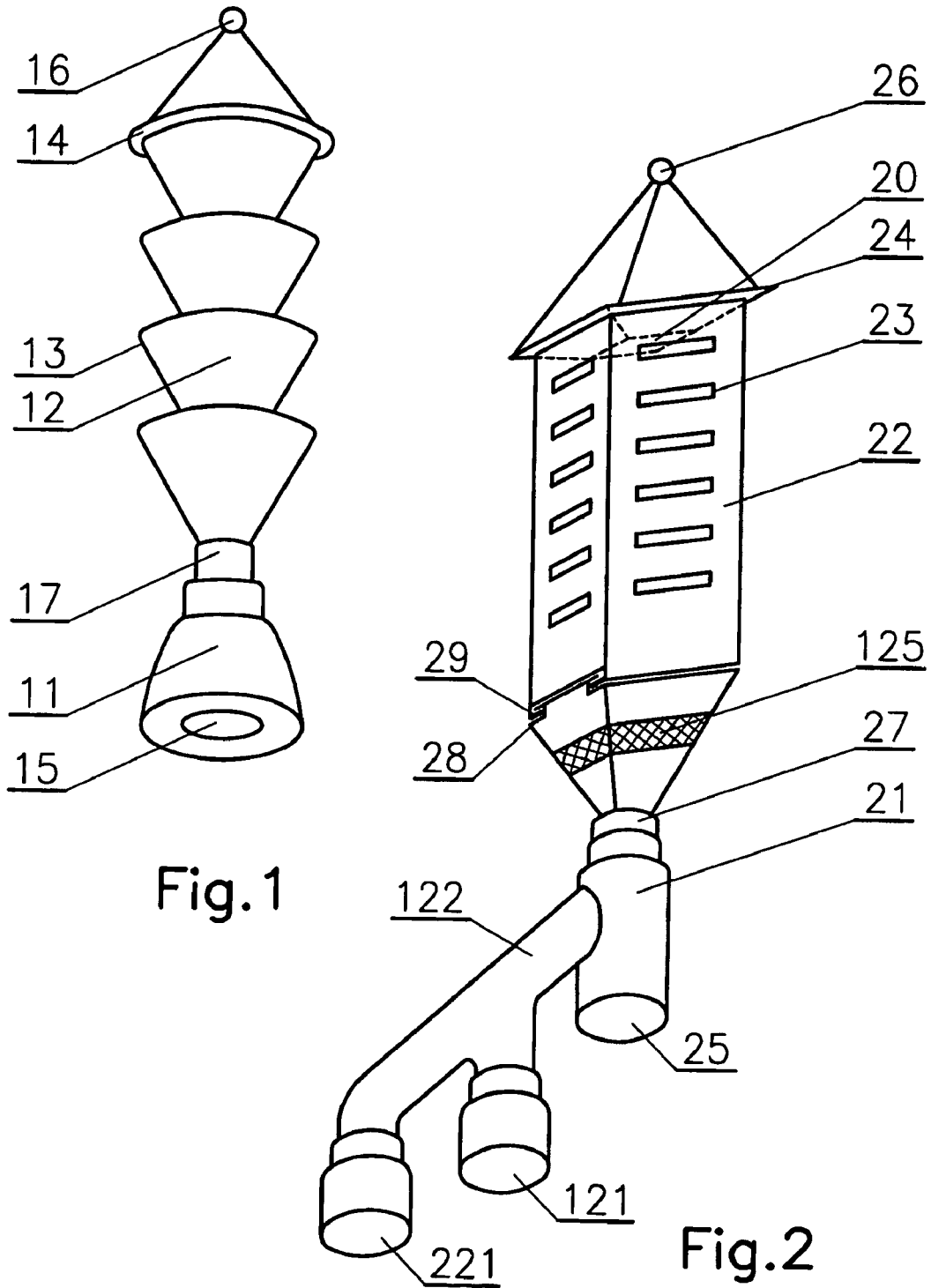

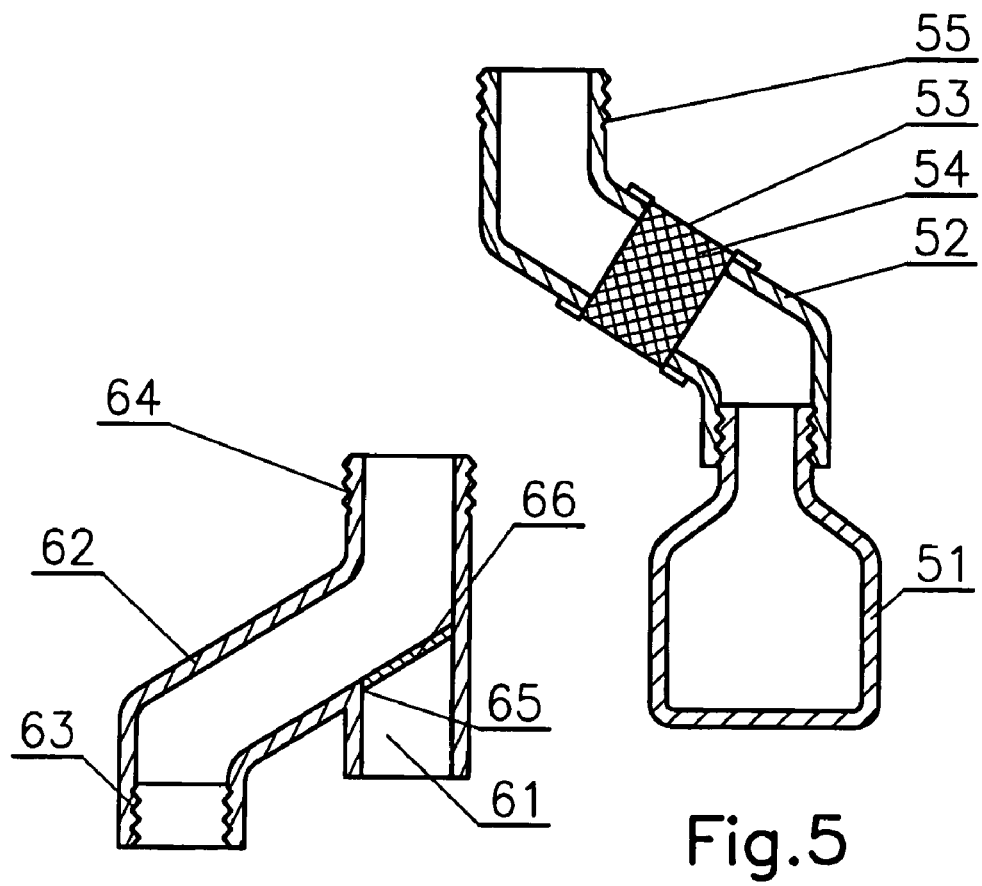
Fig.5
Fig.6
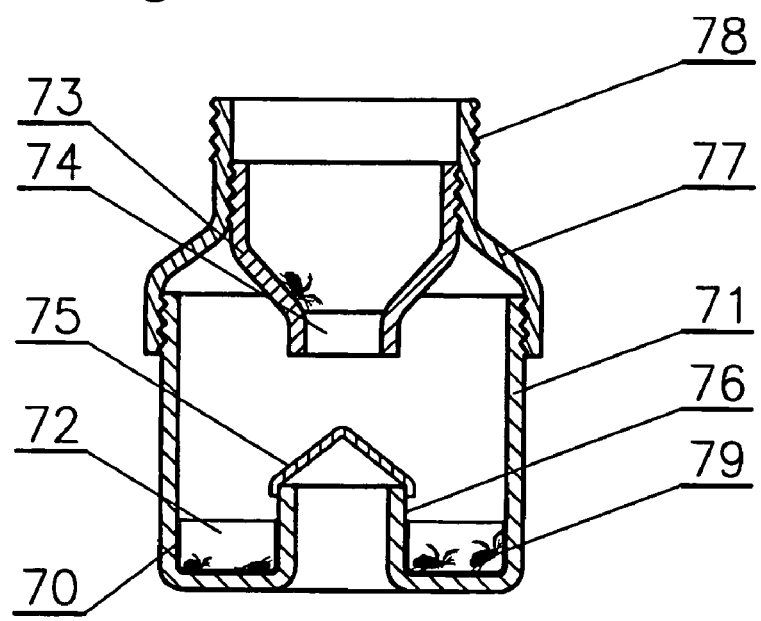
Fig.7

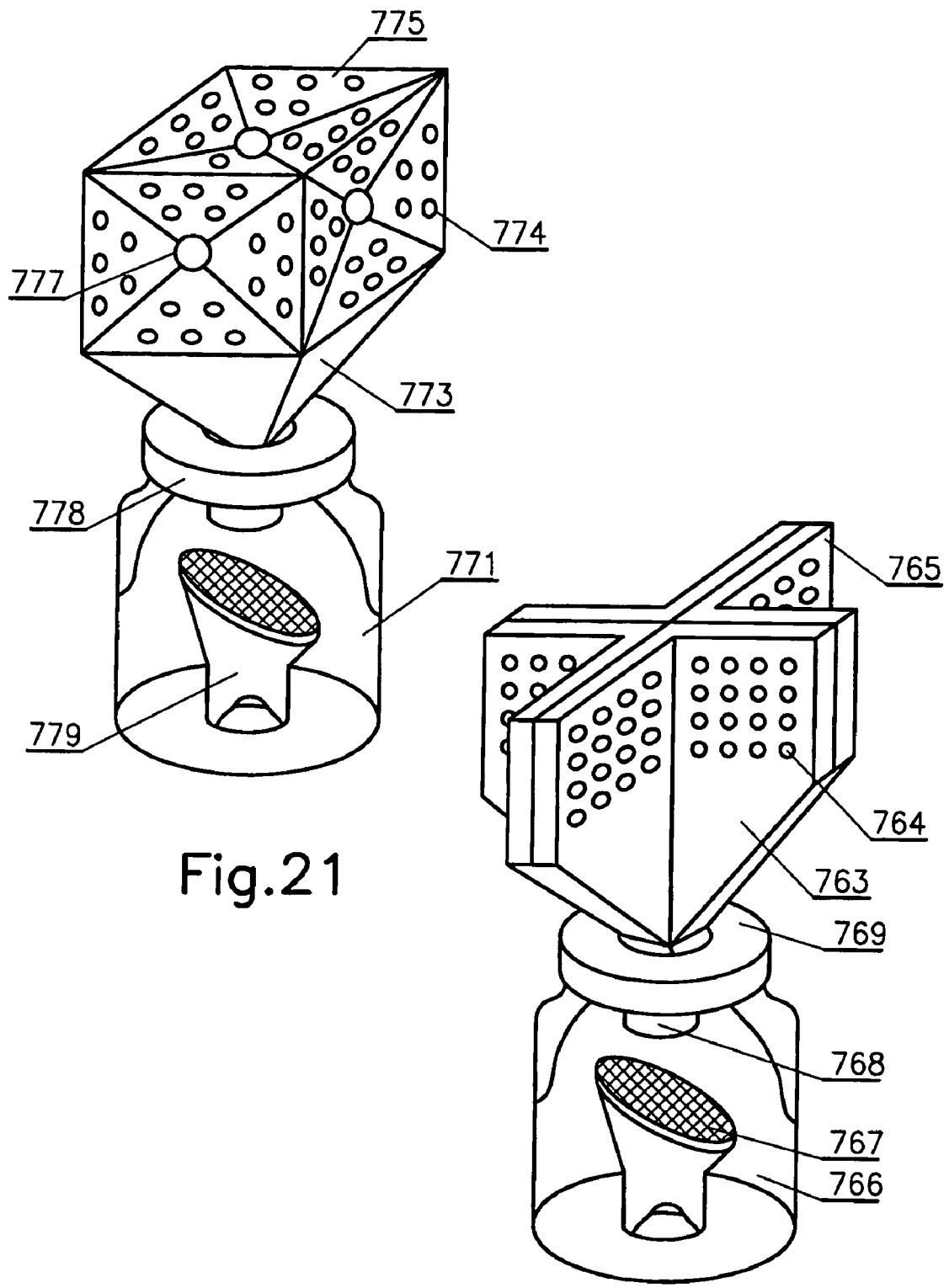

TRAP FOR CATCHING WOODLAND, GARDEN AND AGRICULTURAL INSECT PESTS AND METHOD FOR TRAPPING AND STORING WOODLAND, GARDEN AND AGRICULTURAL INSECT PESTS

TECHNICAL FIELD

The present invention relates to a trap for catching woodland, garden, and agricultural insect pests, as well as to a method for trapping and storing harmful woodland, garden, and agricultural insect pests.

BACKGROUND ART

There are many different types of traps used in Polish forestry to fight and to control the appearance of harmful insects or insect pests. Among these are the tube-type Borregaard traps, the slit box Theysohn traps, as well as segment-shaped and triangular barrier type ones. The Czech Republic, in turn, favors the cross barrier-type Ecotrap traps.

The traps usually consist of a catching part and a container for storing captured insects. With the noted exception of the Theysohn trap, the storage containers are usually bottle-shaped. Their bottoms usually have, in the center, a small opening, covered with fine mesh. In the Theysohn traps the container for storing captured insects has an oblong shape, and has the form of a removable drawer, located at the bottom of the trap. The trap's bottom contains three, symmetrically spaced out openings, covered with metal mesh. In traps used in the Czech Republic, the entire bottom of the trap is made up of a fine mesh.

In spite of the openings situated into the bottoms of the catching containers used for storing the captured insects, they are often fill up with rainwater. This is due to low permeability of the mesh, its predisposition to getting clogged up, as well as to the openings being placed in the center of the bottoms of the containers. Due to the fact that it is practically impossible to hang the traps in the field, in such a way that would assure the horizontal position of the containers, rainwater tends to linger within, following periods of precipitation. The increased moisture, in such traps, accelerates the decomposition of the captured insects. Their remains, together with other collected debris (conifer needles, pieces of fallen buds and flowers, dust etc.), in turn, contribute to the clogging of the mesh. Shortcomings in system of drainage and storage of captured pests, result in conditions attracting scavenging insects. The noxious odor coming off the decomposing insects, in effect lowers the catch-off rate by as much as fifty percent. Moreover, the alive insects, inside the seldom-emptied containers, generate scents and sounds, which frighten off other insects heading toward the traps. The above mentioned drawbacks of the traps cause that the traps containers have to be emptied at least once a week, which is extremely burdensome, tedious, and expensive—especially in mountainous areas.

The presently used traps are used to catch various insects. However, as a rule, each single trap is designated for catching a specific kind of insects. The Polish patent No. 110924 describes an insect trap, using various types of baiting substances. Its main element is a foil sleeve, mounted on a scaffold, and fastened to a base. Edges of the foil sleeve are placed over the edge of a frame, creating two pockets, into which the captured insects fall.

One of the known solutions is presented in the Polish patent No. 120629, which describes an insect trap used mostly to catch wood worms. The tube-shaped body of this trap is equipped with projections, between which openings are placed. The projections are arranged in corkscrew fashion, facilitating the insects' progression towards the inlet openings.

Another solution is presented in Polish patent No. 123775, which describes a trap for catching butterflies. It is made up of a funnel, with a smooth inner surface, set inside a tube. The funnel is surmounted by a roof with an attached ring, from which the bait is hanged.

The Polish patent No. 123776 describes a trap for catching wood worms. It consists of two triangular pieces of foil, attached to a crossbar. The edges of the foil are folded to form gutters. The tops of the foil pieces are fastened with a clamp collar inside a funnel, connected to a container.

One of the known solutions is presented in the Polish patent No. 150897, which describes a segmented container for storing caught wood worms. Between the top and bottom segments, intermediate segments, equipped with mesh strainers, are placed. These are arranged with the segments containing the most loosely woven mesh, placed above those with the finer mesh.

Another known solution is presented in the Polish patent No. 154420, which describes an earth trap for catching insects. Its main element is a container equipped with an inlet opening, around which an earth mound—with a gradient of 5° to 40°—is made.

The Polish patent No. 167442 describes a ground surface trap, used to catch weevils. It is made up of a closed container, equipped with inlet openings, drainage openings, and a baiting substance. The inlets to this trap are constructed of tubes, let into its interior.

Another trap is presented in the Polish patent No. 170106 and this is a selective field trap for catching flies, including a container with a removable lid, inside of which a source of fumes of a chemical baiting agent is placed.

Known solution is also presented in the Polish patent No. 178779 describing an insect baiting station in the form of a hollow body, with a base, and a cover attached to that base. The cover is equipped with a bridge, situated over the bottom, and a chamber, containing liquid bait.

The Polish patent No. 177998 describes an insert to a grasping trap. It has the form of a truncated cone, with a funnel covered with a nontoxic adhesive substance, applied to the funnel's mantle in trapezoid-shaped strips.

AIM OF THE INVENTION

The purpose of the present invention is to develop a trap, the field maintenance of which would be less laborious, and which—thanks to improved drainage and method of storing the caught insects—would be more efficient than the existing designs.

DISCLOSURE OF THE INVENTION

The present invention relates to a trap for catching woodland, garden, and agricultural insect pests, consisting of a catching part with an outlet opening, and a container for storing caught pests. The trap has a device for separating the captured pests from water and small debris, which is placed on a caught pests movement path extending form the outlet opening to the container that means that the device for separating the captured pests from water and small debris is placed between the outlet opening of the catching part and the container.

The device for separating the caught pests from water and small debris can have a shape of a funnel having a funnel inlet covered up by a mesh and an funnel outlet situated outside of the container for storing the caught pests wherein the funnel inlet is placed below the outlet opening of the catching part or a shape of a funnel, made out of rolled up edges of an opening located in a bottom or in one of side walls of the container for storing the caught pests, wherein an inlet of the funnel is covered up by a mesh, and its outlet is situated outside of the container for storing the captured pests and the inlet of the funnel is placed below the outlet opening of the catching part and wherein the inlet to the funnel overlaps a horizontal projection of the outlet opening of the catching part.

The mesh covering the funnel inlet can be situated parallel, or at an angle to the bottom of the container for storing the caught pests.

It is possible that the device for separating the caught pests from water and small debris is a mesh-made tube insert situated at an angle and connecting the catching part with the container for storing the caught pests or can be a tube formed from mesh.

The device for separating the caught pests from water and small debris can be a sloping partition, situated above the container, with drainage openings, an edge of which adjoins an edge of an opening of an additional container attached to a bottom or to a side wall of the container.

The sloping partition contains a mesh-covered opening, situated below the outlet opening of the catching part, wherein the outlet opening overlaps the mesh-covered opening.

The device for separating the caught pests from water and small debris can have a shape of a funnel covered at the top by a mesh. A lower outlet of the funnel can be formed as a double elbow with branching tubes having ends set in openings made in side walls of the container. The funnel's inlet opening can be situated under the outlet opening of the trap's catching part, and should be not smaller than the outlet opening of the catching part.

The device for separating the caught pests from water and small debris can be a mesh placed between the side wall and a sloping partition, which protrudes outside the container, through an opening made in a side wall of the container.

Preferably the sloping partition, located under the mesh, and the mesh itself, are situated at an angle to a leveled bottom of the container and wherein a chamber for storing the captured insects, is marked out by the partition and the bottom of the container and at the same time, the mesh is situated under the outlet opening of the trap's catching part, and is not smaller than the said outlet opening of the catching part.

Preferably the catching part is connected to the container through a reducer forming a device for directing pests, water and small debris towards the device for separating the captured pests from water and small debris.

The device for separating the captured pests from water and small debris can be a mesh placed in openings made in sloping walls of the reducer.

Preferably the container for storing the caught pests is partially filled by a solution of water, light and heavy alcohols, detergent, and an attracting agent or by a solution of water, ethylene glycol (20-100%), ethanol (10-50%), antitranspirant (1-5%), and a functional form of a pheromone (3-20‰).

Preferably the container for storing the caught pests is made of transparent material and a side wall of the container is provided With a scale allowing to define amount of caught pests without taking them out and counting.

The reducer can match the outlet opening of the catching part to a surface of a filtering mesh placed in the container for storing the captured insects.

The catching part can be topped by a roof containing an opening.

Preferably the mesh is made from a hydrophobic material.

Preferably the catching part has a device directing insects towards the device for separating the captured insects from water and small debris.

It is possible that the catching part has shape of a container, opened at its top, narrowing towards its bottom and provided with a lower part forming a directing device.

The space between the catching part and the roof can create an entrance area facilitating easier entering the trap.

The catching part and the container for the caught pests can be covered with a mesh sack, top edges of which are fastened tightly with outer edges of the container.

An outer element of the catching part can have a shape of a pyramid having an opening at its top.

Preferably below the opening of the pyramid an inner element is placed, which forms a directing device, the outlet opening of which is placed above the separating device.

Round the opening of the pyramid can be placed an elastic flange sealing the outer element of the catching part to the inner element of the catching part.

Preferably side walls of the pyramid have a shape of a trapezoid and are set at an angle of between 25 to 35 degrees to the ground level. Furthermore, the side walls of the pyramid can be made of a dark material fastened to a rigid frame. The side walls of the pyramid can end with an apron, which is partially buried in the ground.

The catching part can be a container in a shape of a truncated wedge finished at its bottom with a directing device.

Side walls of the container can be provided with mini funnels, which narrow towards container's inside.

Preferably the mini funnels are shaped as truncated cones or gutters connected with U-shaped clamps.

Outer walls of the container can be harmonica-shaped divided into multiple symmetrical wedges connected by elastic links.

Preferably the catching part is formed from cuboids connected together and situated creating a star-shape or is a cuboid having walls with small openings or mini funnels on them and larger entrance openings.

The device for separating the caught pests from water and small debris can be an additional container with walls made of material penetrable by the water and steam and not penetrable by the light. The additional container can have an opening in its upper part, which leads to a container, made of material penetrable by the light, for storing the caught pests.

The present invention also relates to a method for catching woodland, garden, and agricultural insect pests, using a trap consisting of a catching part and a container for storing the captured insects characterized in that the trap with a device separating the captured pests from water and small debris, placed on a path along which the caught pests move, is hung with a bottom of the container for storing the caught insects being in horizontal position. The outlet opening of the catching part can be directed towards the device for separating the captured insects from water and small debris using a directing device.

BRIEF DESCRIPTION OF THE DRAWINGS

The object of this invention is shown in implementation examples in the enclosed drawings, in which:

FIG. 1 shows a perspective view of a segmented trap, with a container for storing the caught insects;

FIG. 2 shows a funnel and post trap with a set of containers for storing the caught insects;

FIG. 5 shows a cross-section of a connecting element, culminating in a container for storing the caught insects;

FIG. 6 shows a cross-section of the connecting element, with the funnel positioned downwards;

FIG. 7 shows a cross-section of the container for storing the caught insects, including a reducer;

FIG. 20 presents a perspective view of a cross-perpendicular trap type with mini funnels;

FIG. 21 shows a perspective view of a edge-perpendicular trap type with immerse walls, which forms a pyramid;

BEST MODE FOR CARRYING OUT THE INVENTION

Figure 3:
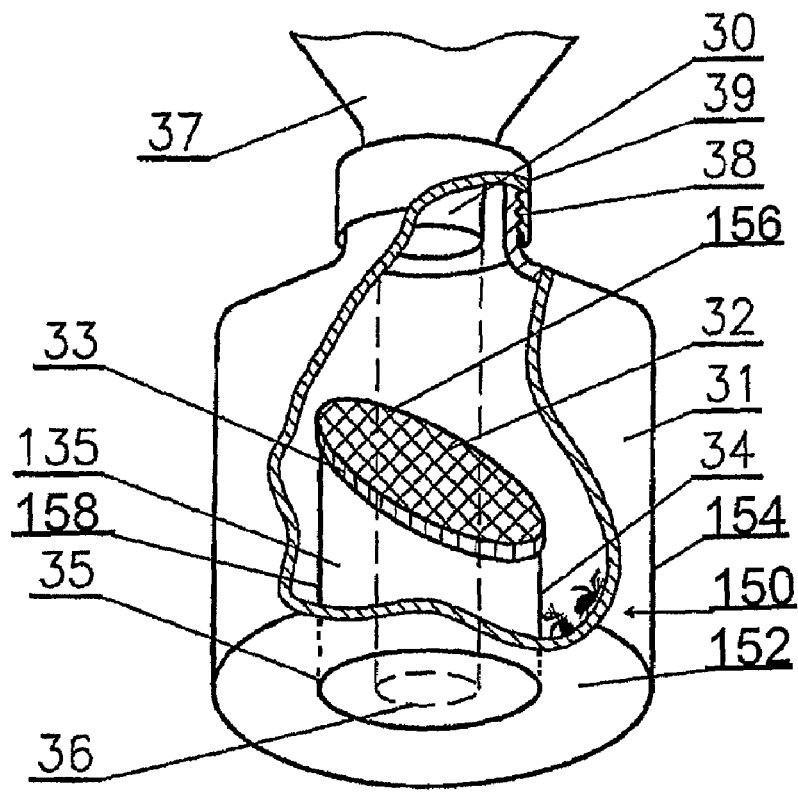
FIG. 3 shows the container for storing the caught insects, affording a view of its interior.

The best mode for carrying out the invention will be presented according to the accompanying set of drawings where first the novel container of the trap and water drainage system will be presented and second the novel catching part of the trap will be disclosed.

A trap shown in FIG. 1 is basically made up of a catching part 12 and a container 11 used for storing the caught insects, including pests. The catching part 12 of the trap is made up of a number (which varies depending on the solution) of funnel-shaped segments 13. The catching part is surmounted by a cover 14, with a handle 16. A bottom of the catching part ends in a device directing the insects and water or a reducer 17 with an outlet opening. The bottom of the container 11 has an opening 15. The edge of the opening 15 is rolled, forming a funnel, covered on top with a mesh. The surface of the reducer 17 outlet is smaller than the mesh-covered inlet opening of the funnel. The insects, which enter the trap, fall onto the mesh covering the funnel of the container (not shown), and after sliding down its sides, fall into the container 11. Water dripping onto the mesh, cleans it of small debris and dust, and then flows outside through the opening 15. The mesh is constructed of hydrophobic and antistatic material, which holds the additional benefit of being bereft of lingering water and dust particles.

FIG. 2 shows a funnel-post type trap, the catching part 22 which is made up of a post-shaped box 23, containing openings, through which the insects enter inside of the trap. The box 23 is surmounted by a roof 24, containing an opening 20, through which the insects fall into the trap. The handle 26, is used as an attachment point for hanging the trap (for instance, on a tree). Such handles may also be located on the sidewalls of the trap. The bottom part of the box 23, contains a runner 29, into which slides a reducer 27, equipped with fasteners 28. To the bottom part of the reducer 27, is fastened the detachable container 21, along with a set of subcontainers 121, 221, which are connected by a three-way element 122. The three-way element 122, contains an opening 25—situated below the outlet of the reducer 27—through which water and small debris exit the trap. Above the opening 25—at the level of the three-way element—a mesh, separating the water and small debris from the captured insects is placed. There is a similarly placed mesh (a finer one) over the subcontainer 121 (which constitutes a part of the container 21). A flattened reducer 27—the shape and size of which matches to the upper opening, and which may have dimensions corresponding to those of the drawer in the Theysohn trap—was set between the catching part and a container holding an attracting-conserving liquid. The walls of the reducer, or the sloping walls of the catching part (in the case of a solution not including a reducer), are steep enough not to allow the captured insects to climb out of the trap. The sloping walls of the catching part, or the walls of the reducer 27, contain mesh-covered drainage openings 125. The upper part of the reducer comprises (similarly as the original drawer-shaped containers) protruding strips that can be drawn back, tightly corresponding to the dimensions of the trap, which allows the sliding of the flattened reducer into the fastening grooves of the catching part. The bottom of the reducer contains a threaded protrusion, onto which the bottle-like container can be screwed.

FIG. 3 shows a container for storing the caught insects, which is connected to reducer or the catching part 37 of the trap, by the means of a threaded connection, the nut 39, which is attached to the catching part 37 in such a way that it may be twisted, and which is screwed onto the threaded neck 38 of the container 31. The catching part 37 is let into the container 31 through the funnel-shaped outlet 30. The bottom of the container 31 has an opening 35, the rolled/folded up edges of which form a device 158 in the shape of a funnel 135, which in turn is covered by a mesh cap or a screw-on mesh 32, with a band 33, clasping the funnel 135. In the solution shown in FIG. 3, the funnel 135 is truncated diagonally in relation to the horizontal part of the container's bottom, so that the insects 34, which have fallen into the container 31, slide down the sloping mesh 32 and fall into a chamber 150 formed by the wall of the funnel 135, the ring-shaped part 152 of the container 31, and by its side walls 154. The funnel should be truncated at the angle of between a few, and 45 degrees. Such an angle of truncation facilitates the insects and debris falling into the container, instead of lingering on the mesh. In this way, one avoids the clogging of the mesh, and the seeping of rainwater into the conserving liquid—which is a solution of water, a light and heavy alcohol mixture, detergent, and pheromone. Also the seeping of rainwater into the conserving liquid is prevented by the construction of the catching part outlet, the essence of which lies in that, as seen face on, the area of the outlet 36 of the catching part 37 is at least equal to that of the funnel 135 inlet opening 156, and is within the surface size of that funnel 135 opening.

Figure 4:
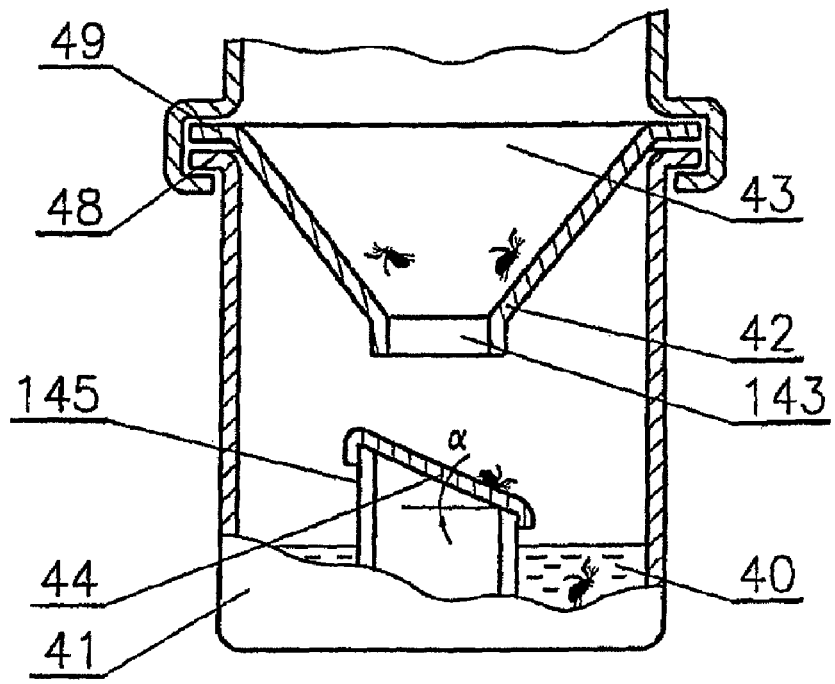
FIG. 4 shows a partial cross-section through a box-type container for storing the caught insects.

FIG. 4 shows a cross-section through the container for storing the caught insects. This container is an obtuse-angled or a parallelogram-shaped box 41, opened at the top, and made from plastic or cardboard. It is partially filled with a conserving liquid 40, together with an insect-attracting agent. The bottom of the box 41 has a rectangular opening, the folded up edges of which form a funnel 145. The funnel 145 is diagonally truncated at the top, and its inlet is covered with a mesh 44—situated at α angle to the surface of the conserving liquid 40, and the bottom of the container. The captured insects move down the angled mesh 44 and fall into the conserving liquid, which prevents the decomposition of the dead insects. The conserving liquid can be a solution of water, light and heavy alcohols, detergent, and an attracting agent or a solution of water, ethylene glycol (20-100%), ethanol (10-50%), antitranspirant (1-5%), and a functional form of a pheromone (3-20‰). The inlet of the funnel 145, is situated under the opening of the trap's catching part 43. Seen face on, the area of the funnel's inlet opening, is at least equal to that of the outlet opening 143 of the reducer 42. From both top edges of the container 41, fastening strips 48 protrude, which tightly fit to the runner grooves 49, in such a way as to allow the container 41 to be slid in, or hanged below the trap's catching part. The reducer 42 serves to fit the size of the catching part outlet, to that of the funnel 145 inlet. It may be an integral part of the trap's catching part, or be inserted into the container 41. The lower part of the reducer 42, contains an opening 143, through which rainwater is directed over the surface of the funnel mesh. The reducer outlet is shaped in such a way, which does not allow the escape of captured insects. It also prevents larger insects—especially scavengers—from entering the container.

FIGS. 5, and 6 show elements used to connect the catching part of the trap with the container for storing the captured insects. The connecting element 52, has a shape of a bent tube. Its lower end has an interior thread allowing attaching the connecting element 52 to the container 51. The connecting element contains a tube insert 53, made up of a mesh 54. The insert may be secured, in the connecting element, in such a way as to allow twisting. In the tube insert 53—located along the path of the insects movement from the catching part to the container 51—the water is drained and the insects fall into the container 51 for storing the captured insects. The thread 55, allows for attaching the connecting element to the catching part of the trap.

The connecting element 62, in turn, has an opening 65, covered with a mesh 66. The edges of the opening 65 are rolled down, forming a funnel 61. The upper part of the connecting element 62 culminates in a protrusion 64. The bottom part of the connecting element 62 has an interior thread 63 for attaching the container, which store the captured insects.

FIG. 7 shows a cross-section of the container 71 for storing the captured insects. It is cylindrical in shape, with its open top end being threaded, and the closed bottom containing an opening, the edge of which forms a funnel 76. The funnel 76 is surmounted by a conical or convex mesh 75. Over the inlet of the funnel, the opening 74 of the reducer 73 is located, through which the captured insects fall into the container 71, the inside wall of which is covered with an attracting and toxic substance 70. After sliding down the mesh 75, the insects gather in the chamber 72, formed by the wall of the funnel 76, the ring-shaped container bottom, and the side wall of the container 71. The inside wall of the container 71 is partially covered with a toxic and attracting substance. An intermediate element 77, with a threaded protrusion 78 of the catching part, is screwed onto the container 71. The purpose of the intermediate element 77, is to position the reducer 73, that allows for matching the outlet opening of the trap's catching part to the inlet of the funnel 76.

Figure 8:
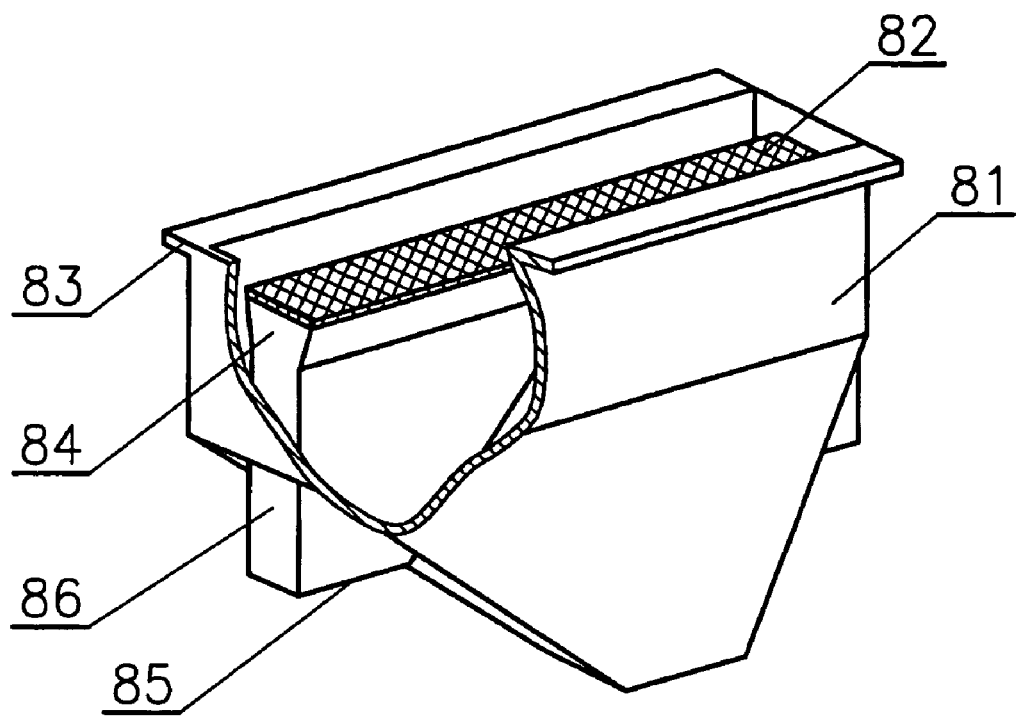
FIGS. 8, and 9 show a side drained container for storing the caught insects.

FIG. 8 shows a container 81, with a section of its side wall cut out in order to show the shape of its funnel. The container 81 for storing captured insects contains a side-mounted water drain, the outlet 85 of which is set in the bottom wall of the container. The container is a drawer with an opened box-shaped top part made of plastic or card box. In another embodiment, the outlet 86 is situated vertically. The insects, falling in from the catching part (not shown), land on the mesh 82 situated on the path along which the insects move, along with water and debris. The water and small debris pass through the mesh and fall into the funnel 84, the bottom of which slopes from the center of the container to the side wall of the container. The water, along with small debris, flows out of the outlet 85. After landing on the mesh 82, the insects slide down and are gathered in the catching chamber formed by the side walls of the container 81, and the side walls of the funnel 84. The container 81 is equipped with protruding clasps 83, by means of which the container 81 is attached to the catching part of the trap.

Figure 9:
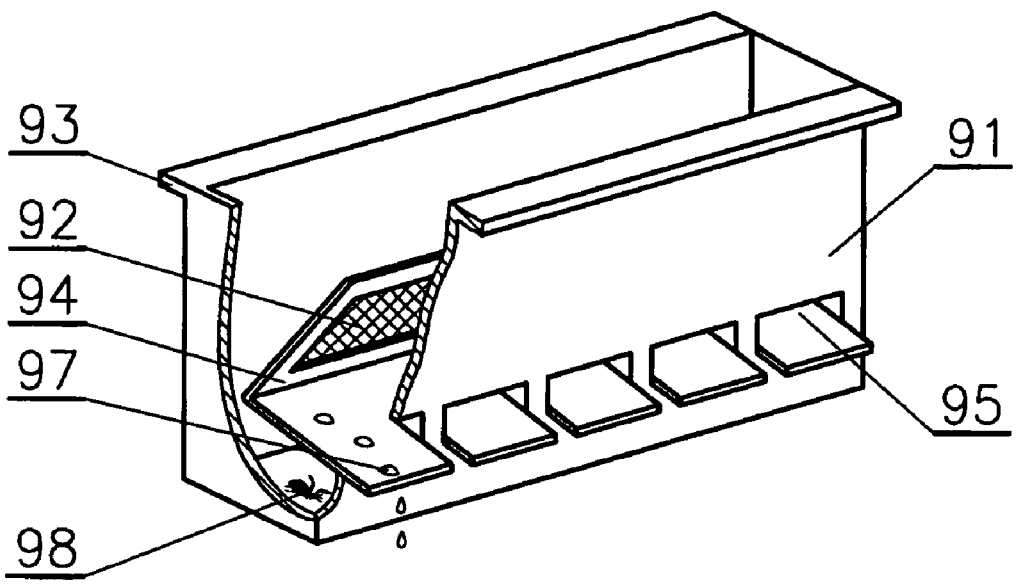

FIG. 9 shows the container 91, with a section of the side wall cut out in order to show a device for separating water and small debris from the captured insects. This device is made up of, a mesh 92, covering an opening in the folded wall 94 of a chamber with a side-mounted water drain 95. The insects, falling in from the catching part (not shown), land on the mesh 92 situated on the path along which the insects move with water 97 and debris. The water 97 and small debris pass through the mesh and fall into the chamber with a side-mounted water drain 95. After landing on the mesh 92, the insects 98 slide down and are gathered in the chamber formed by the folded wall 94, and the side walls of the container 91. The container 91 is equipped with protruding clasps 93, by means of which the container 91 is attached to the catching part of the trap.

Figure 10:
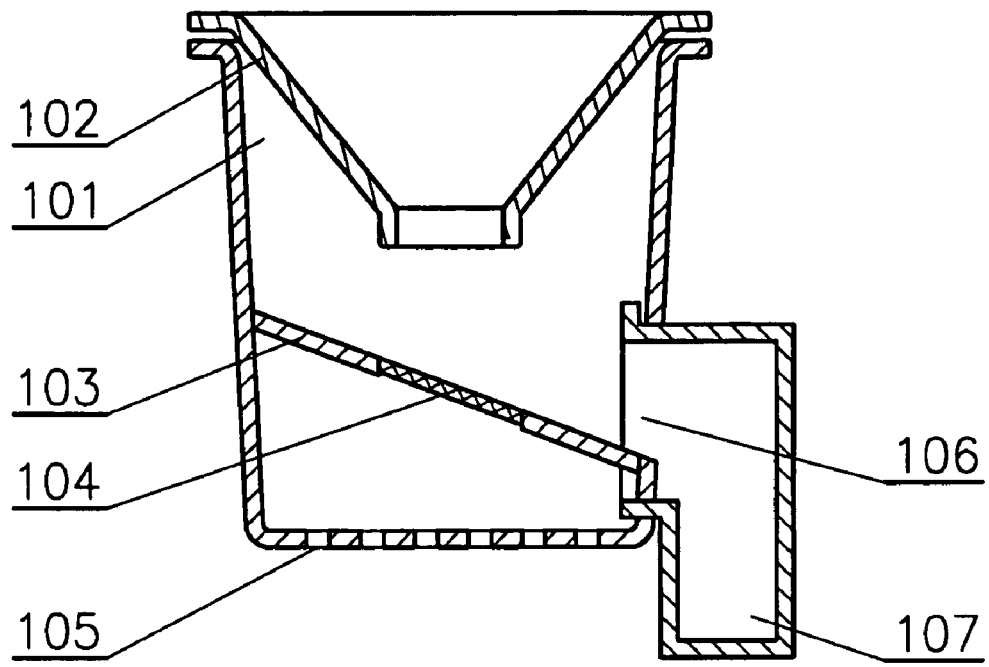
FIGS. 10, and 11 show a container for storing the caught insects, with an additional tank for storing the caught insects.
Figure 11:
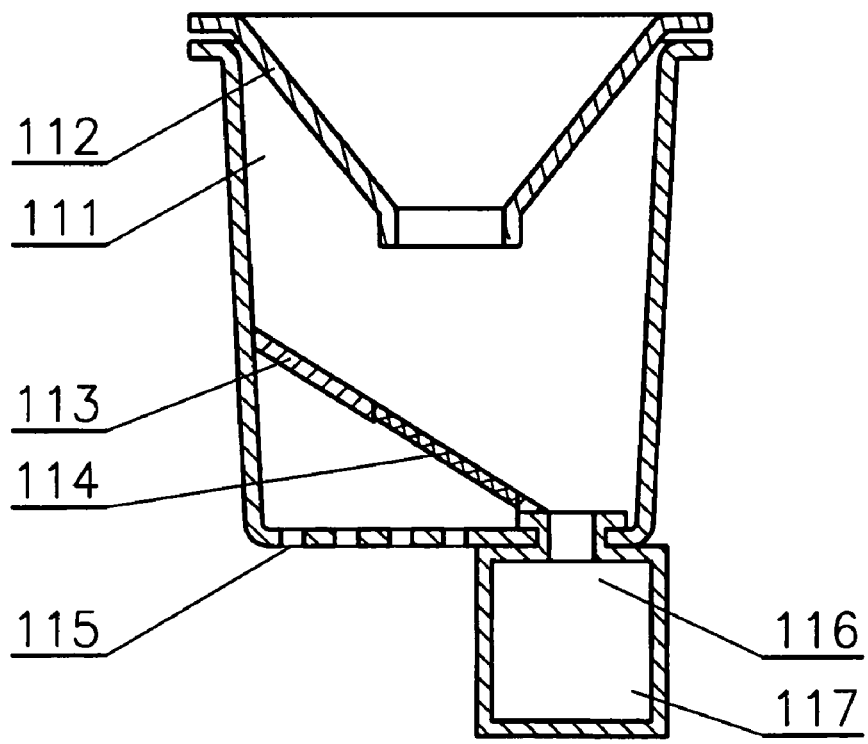

FIGS. 10 and 11 show a container for storing the captured insects, with an additional container for storing the captured insects. A device directing the insects and water or a reducer 102, shown in FIG. 10, directs water and insects over the mesh 104 in the container 101, located on the sloping wall 103. The insects are separated out on the mesh 104. They next fall through the opening 106 into the additional container 107 for storing the captured insects. The water drains out of the openings 105, located in the bottom of the container 101. The container 111, shown in FIG. 11, is located beneath a device directing the insects and water or a reducer 112. It also contains a sloping wall 113, equipped with mesh 114. The two embodiments differ only in that the additional container 117 (detachable) for storing the captured insects, namely the container shown in FIG. 11, is attached to the bottom of the container, and not to the side wall, as is the case shown in FIG. 10. The insects, after being separated out over the mesh 114, fall through the opening 116 into the additional container 117, which may be filled with a solution containing an attracting substance. The water, which seeped through the mesh, flows out through openings 115.

Figure 12:
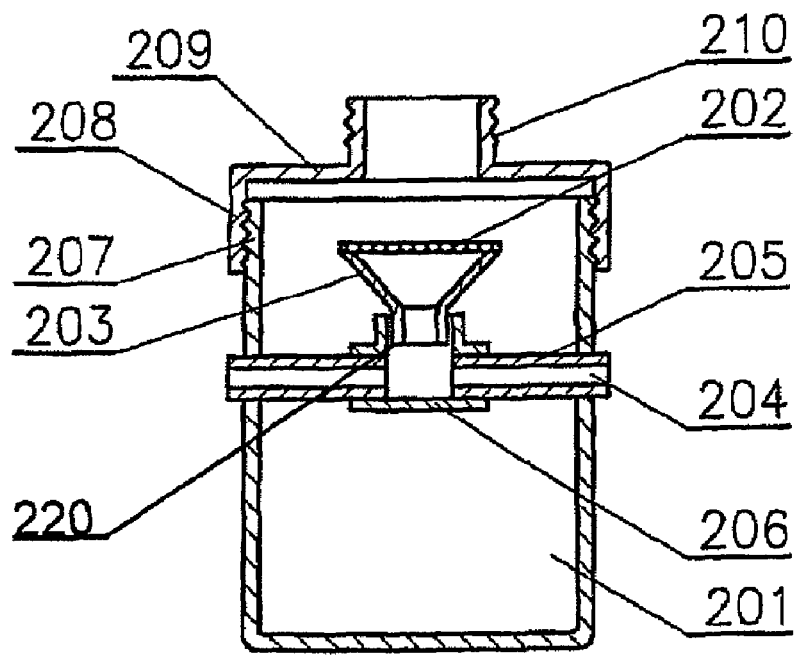
FIGS. 12, and 13 show containers for storing the caught insects, with side-mounted water drains.

FIG. 12 shows the container 201 for storing the captured insects, together with a device separating the insects from water and small debris. The device has a shape of a funnel 203, surmounted by a mesh 202. The bottom outlet 220 of the funnel 203 is set within a double elbow 206 with branching tubes 205, the ends of which are set within openings in the side wall of the container 201. The inlet opening of the funnel 203, is situated under the outlet of the trap's catching part (not shown), and is at least equal in area to the surface area of the outlet of the trap's catching part. Rainwater, flowing down from the trap's catching part, seeps through the mesh 202 of the funnel 203. Then it flows out the funnel outlet 220—which is set within the top opening of the double elbow 206—through the branching tubes 205, and drains out of the container 201. The captured insects fall into a chamber, formed by the bottom and the side wall of the container 201.

If need should arise, the double elbow may be substituted with a coupling of three or more outlets, each with its own branching tube leading to the exterior of the container. The top part of the container is threaded 207, which allows for connecting the container 201 with a cover 209, which, in turn, comes equipped with interior threading 208. The cover 209 has a threaded protrusion 210, which allows for connecting the container for storing the captured insects to a reducer, or to the catching part of the trap.

Figure 13:
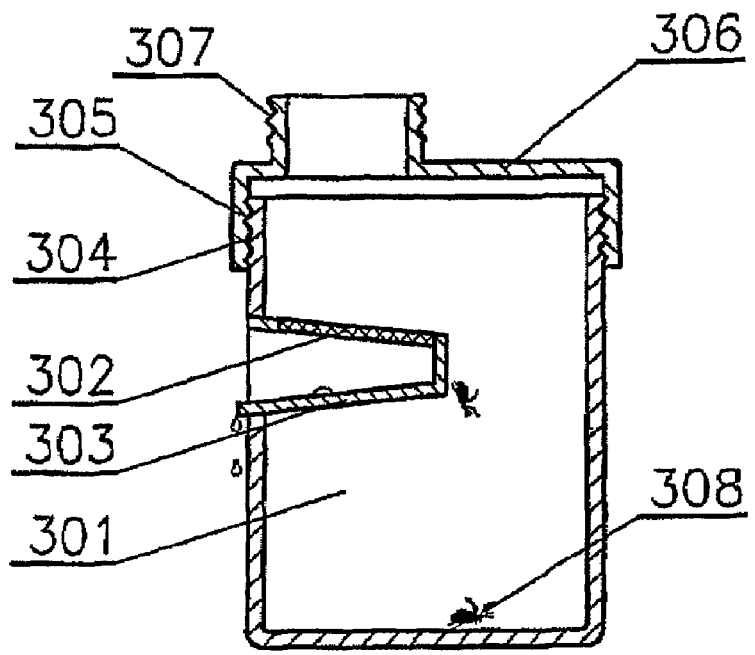

FIG. 13 shows a container 301 for storing the captured insects 308, the cover 306 of which culminates in a threaded protrusion 307, used to attach it to the catching part of the trap. The opening in the cover is not centered, but located directly over an opening covered with a mesh 302, below which is placed a sloping wall, which protrudes out of the container through an opening in the side wall of it. In another embodiment, below the opening covered with the mesh 302, may be located a funnel, the outlet of which is set within the side wall of the container. The mesh 302, as well as the sloping wall or the bottom of the funnel 303, are situated at an angle to the horizontal bottom of the container 301. The area of the inlet of the funnel 303, covered with mesh 302, fits into the size of the outlet of the catching part (not shown), and is located entirely beneath it. In this way, water from precipitation flowing out of the outlet of the trap's catching part, seeps through the mesh onto the bottom of the funnel, and then flows out of the container through the funnel outlet. The cover 306 connects with the cylindrical part of the container, by the means of the interior threading 305 of the cover, and the exterior threading 304 of the cylindrical part of the container.

Figure 14:
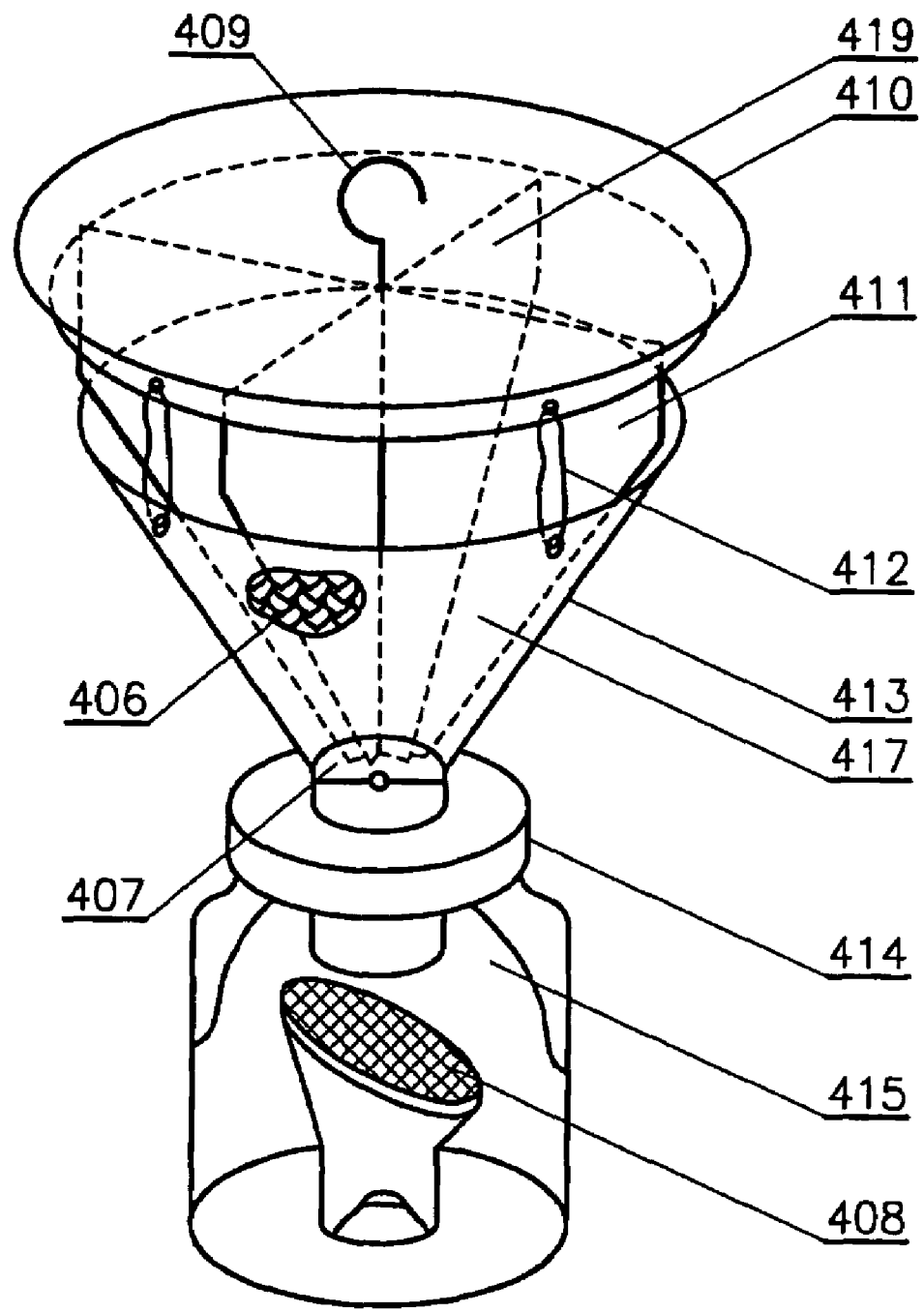
FIG. 14 shows the first embodiment of a cross-shaped trap having a container for the caught insects.

The trap shown in FIG. 14 consists of a catching part 417, and a container 415, joined together with a joining element 414. The catching part 417 is made up of a cone-shaped casing 413, oriented tapered end down, and a cross-shaped construction 419. The cone-shaped casing 413 ends with the device that helps to keep the container 415 in the vertical position and also helps in directing the insects, water and small debris towards the middle of the device 408 separating the captured insects from water and small debris, which in this solution functions also as a ventilating funnel, which facilitates the diffusions of the pheromones. In the presented embodiment the directing device has a shape of a funnel. Its lower opening is situated above the separating device 408 thanks to a flexible connection between the funnel of catching part and the separating device. The flexible connection forms is formed by a soft and closed joint 407. The cone-shaped casing 413 is attached to the trap's roof 410, using fasteners 412. These fasteners 412 are most often made of wire. The diameter of the roof 410 is slightly larger than a diameter of the cone-shaped casing. A hook 409 attached to the roof 410 is used to hang the trap on a branch. The cone-shaped casing contains inside a cross-shaped construction 419, protruding over the cone-shaped casing 413. The outside edges of the cross-shaped construction 419 adjoin the inner walls of the cone-shaped casing 413 and the roof 410. It is advisable, that the inner walls of the cone-shaped casing 413, and also the walls of the cross-shaped construction has a tucking or roofing tile structure 406. Between the roof 410 and the cone-shaped casing 413, is an inlet space or an entrance area 411, facilitating the passage of insects. The aforementioned space between the cone-shaped catching part 413 and the roof 410, amounts from one to three centimeters. In the bottom part of the flexible connection 407 or a susceptible element there is a threaded funnel, used as a connector with cover of the container 415 for storing the caught insects. The bottom of the container 415 for storing the caught insects is situated in horizontal position.

Figure 15:
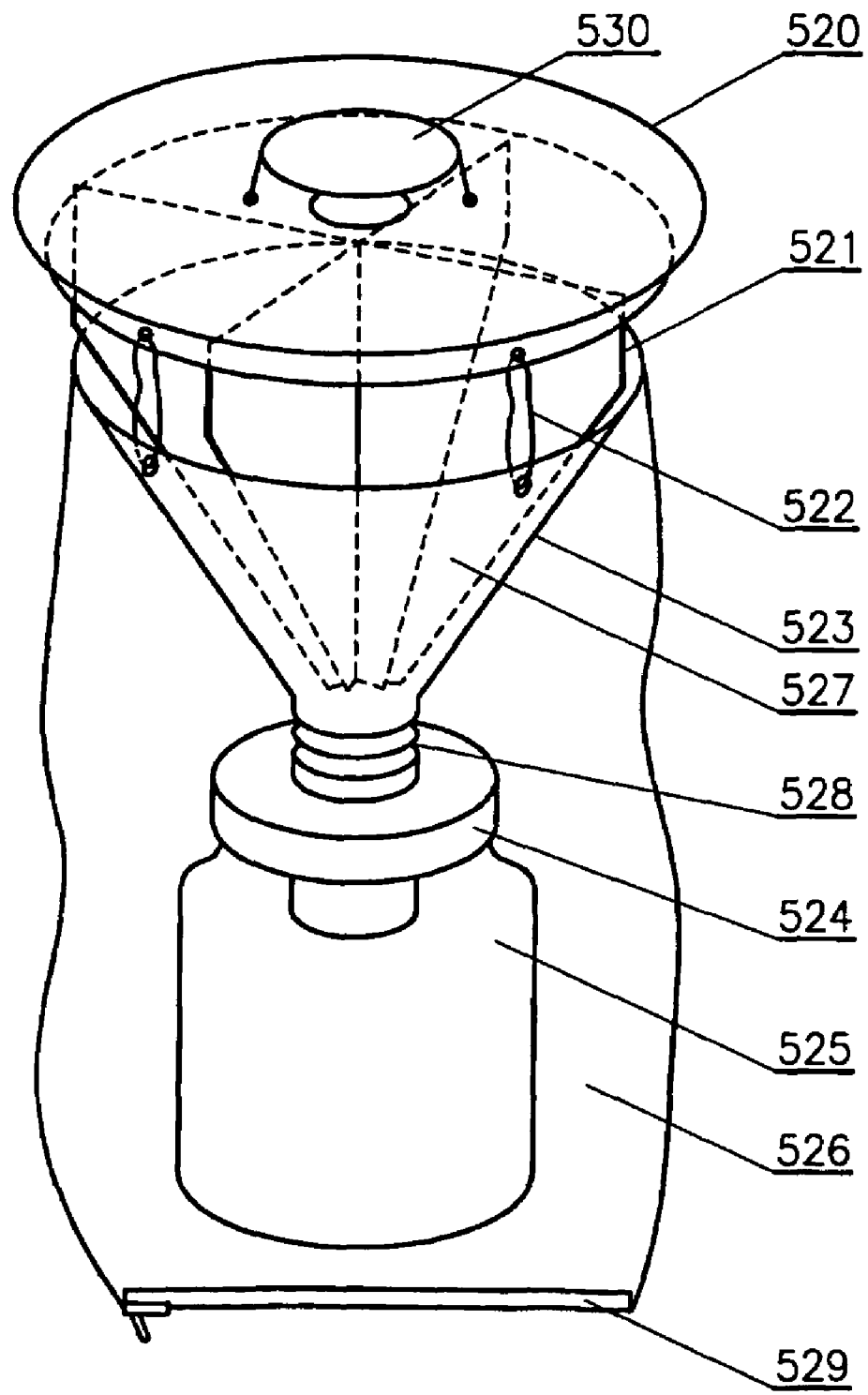
FIG. 15 shows the second embodiment of a cross-shaped trap having a container for the caught insects.

The trap shown in FIG. 15 is a further embodiment of the trap presented in FIG. 14. It consists of a catching part 527, a container 525 for storing the caught insects, a joining element 524, a funnel 528, a device 528 directing the insects and water, a roof 520 connected with a cone-shaped catching part 523 by fasteners 522 made of wire, a catching part 527, a mesh sack 526 and a cross-shaped construction 521. The caching part 527 ends with the device 528 directing the insect and water, which is a flexible pipe or a susceptible element, for instance a follicle-shaped element. In this embodiment, the catching part 527, the device 528 directing the insects and water, and a container 525 for storing the caught insects are situated in the mesh sack 526. The outer edges of the sack 526 adjoin the outside edges of the cone-shaped casing 523. The bottom of the sack 526 finishes in a lock 529, such as a zipper. It provides easy access to the catching container 525 useful for checking an amount of the caught insects. The large outside surface of the sack 526 facilitates the passage of attracted insects towards the trap's inlet opening. It is advisable, like in the previous trap, that the inner walls of the cone-shaped casing 523, and also the walls of the cross-shaped construction 521, can have tucking or roofing tile structure. Another advantage is that the roof 520 is two-story, and the diameter of the opening, that is situated under an additional roofing 530, should amount from ¼ to ⅓ the diameter of the roof.

Figure 16:
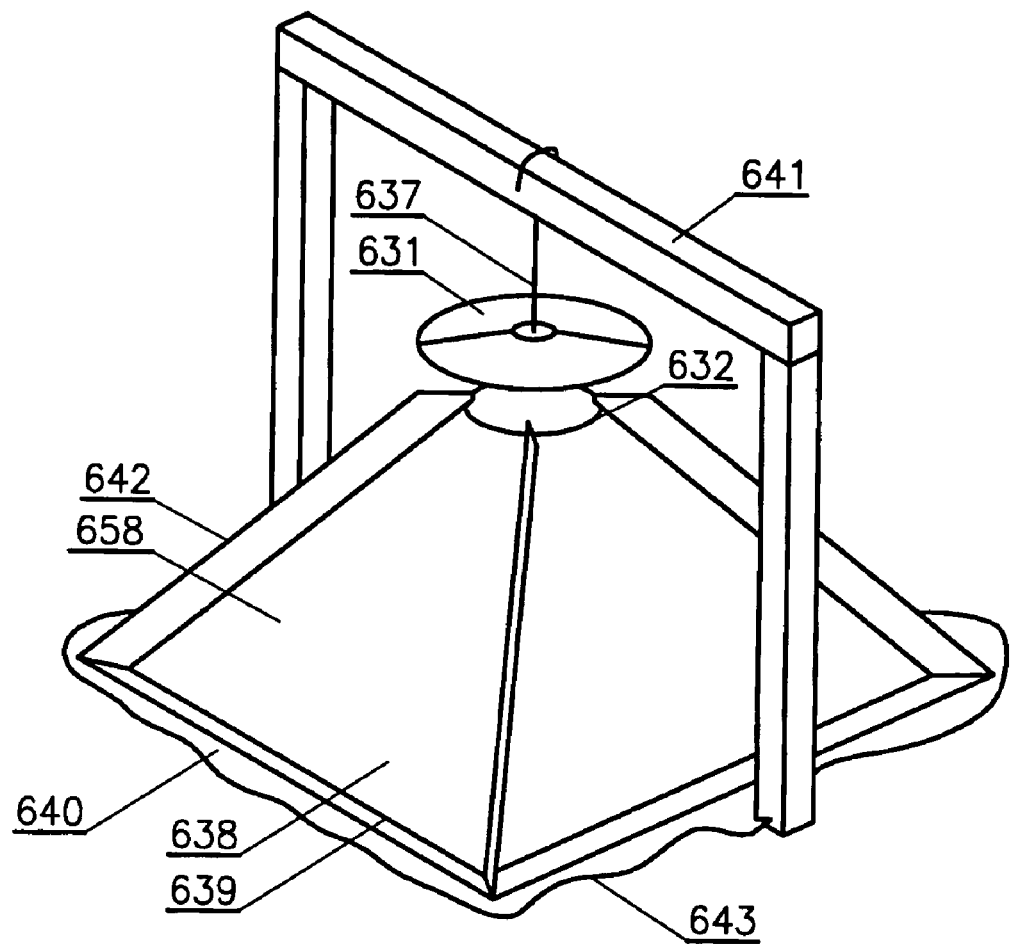
FIG. 16 and FIG. 17 show a trap suited for catching insects roving on the ground.
Figure 17:
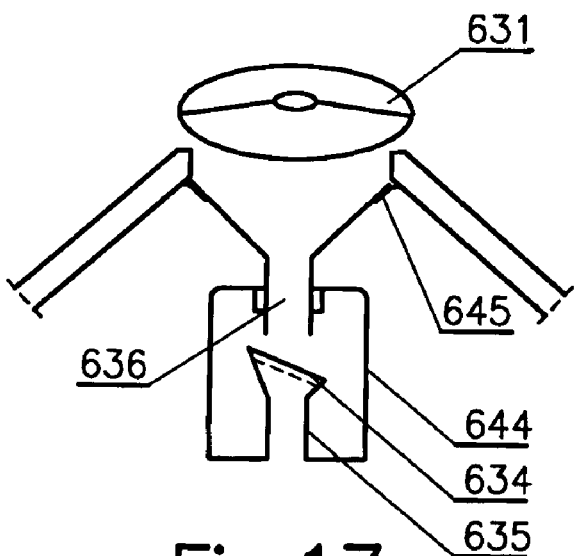

FIGS. 16 and 17 present a trap for catching insects crawling on the surface of the ground. It is particularly adept for catching weevils. FIG. 16 shows a perspective view of the trap. FIG. 17 shows a fragment of the trap top in cross-section. This trap consists of a rising catching part or an outer element 658 and the sloping catching part, which consist of a large funnel 645 and a small funnel 632, to which the container 644 for storing the caught insects is attached by a directing device 636. Four trapezoidal walls 638—preferably made of dark cloth—are the main elements of the rising catching part. Lower edges 643 of the trapezoidal walls 638 are set on a rigid square frame 639. Their upper edges are attached to the external edges of the large funnel 645, which is suspended by a wire fastener 637 attached to a load-bearing brace 641. The trapezoidal walls 638, making up the sides of the trap, are set at 20-25 degrees to the ground surface, making up a truncated pyramid. The surfaces of the trapezoidal walls 638, below the rigid square frame 639 form an apron 640, which is partially buried in the ground 643. The apron 640 protects the trap from swilling out the ground by the water. Vertical directing lists 642 are placed along the seams between the said edges of the walls. At the center of the bottom of the container 644 is located a drainage device 635—the top of which is covered with a mesh 634 or a separating device—which is placed directly below the outlet opening of the funnel 636 forming the directing device. Such form of the bottom of the catching container 644 allows for better ventilation of the trap and for better pheromone turbulence. It also facilitates the drainage of rainwater outside of the catching part, and allows for the use of the attracting-conserving liquid, utilized to store the captured insects. The synthetic attracting agent, in currently accessible form, can be placed under the cover of the catching container or in the funnel of the separating device, underneath the mesh. Above the opening there is a roof 631, which will additionally overshadow the container 644 for storing the caught insects, with conserving liquid and an attracting agent and it will also protect the trap from the dirt, in case of traps set under the forest stand.

One of the known insects is horse chestnut leaf miner (*Camerara ohridella*). It occurs almost in the whole Europe and it damages very seriously the leaves of horse-chestnut every year. There aren't any natural enemies to fight with this insect. The great expansion of it, also in our country, is connected with it's still growing population, from one to three or even to four generations per year. Its artificial sex-pheromone, called CAMERIAWIT, is used usually with the glue type traps, seldom with the funnel type, like VARIOTRAP. One of the substantial disadvantages of such traps is—in case of the glue traps—quick filling and neutralizing of the catching surface, caused by in masses bumping butterflies, whereas in case of VARIOTRAP—the main disadvantage is its structure, which is adapted to catch only large butterflies, not the small ones. Moreover, both types of the traps are put out in upper branches of a tree.

Figures 18, 19:
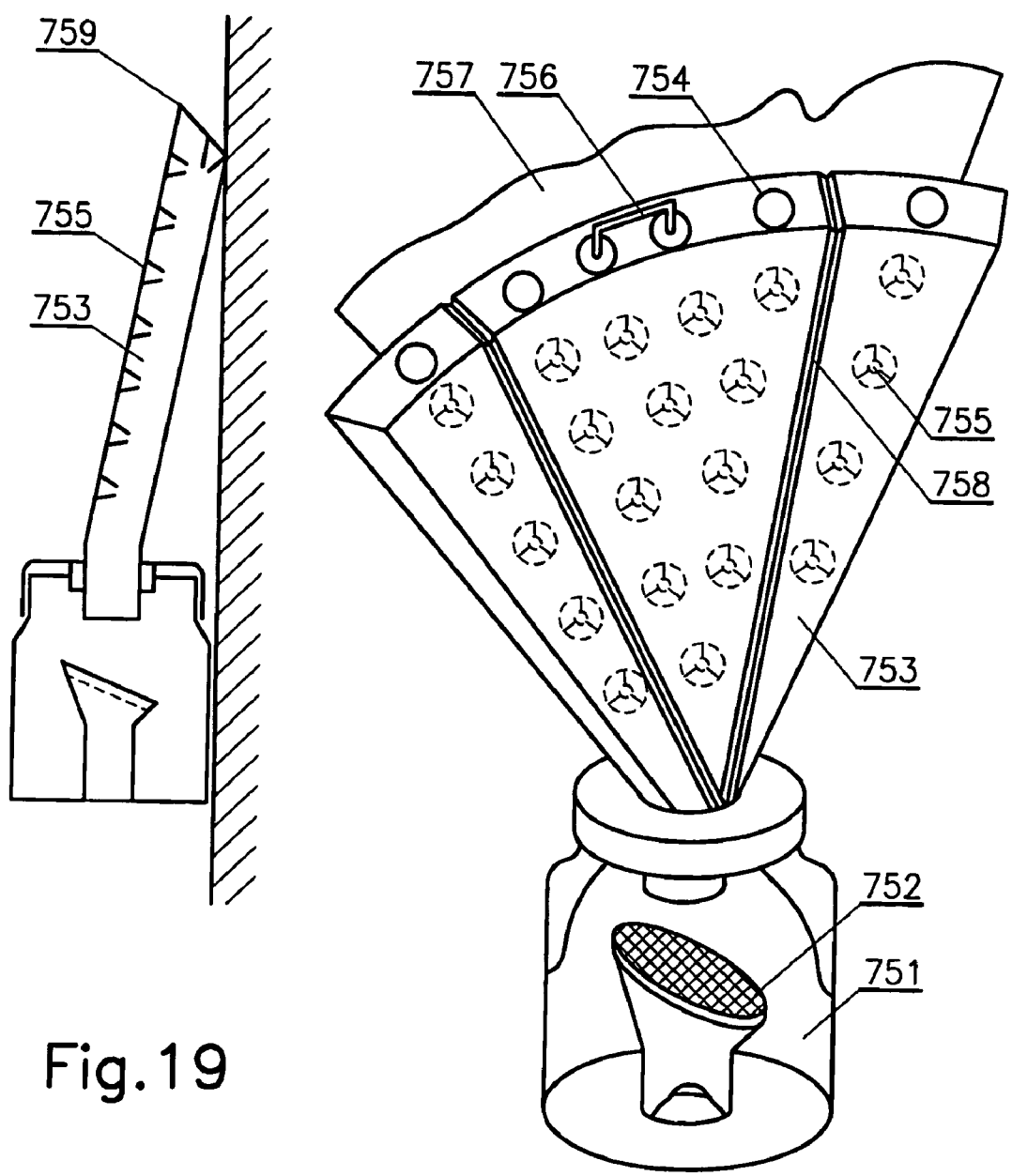
FIG. 18 shows a trunk trap.
FIG. 19 shows a cross-section of the trunk trap.

The most effective means of catching the male horse chestnut leaf miner (*Cameraria ohridella*) using an artificial pheromone, may be achieved with the aid of an adhesive-free mini-funnel trap, located at the bottom section of the tree trunk. This trap, named the trunk trap, was presented as a perspective view in FIG. 18, and in cross-section in FIG. 19.

This trap is made up of a catching part 753, and a catching container 751 for storing the caught insects, equipped with a drainage device 752, separating the captured insects from water and small debris. The novel feature, specific to this trap, lies in the use of mini-funnels 755 in the catching part, thus increasing its catching surface.

The catching part 753 is a container having a shape of a truncated wedge, or a truncated pyramid, the upper part of which may hug the trunk of the horse chestnut, or some other tree or some directing collar 757. The side walls of the pyramid slope at an angle from 35 to 65 degrees to the pyramid's axis of symmetry. The wall facing the tree trunk, and the main catching wall, have the shape of a trapezoid, the upper base of which may be slightly longer than the circumference of the tree trunk or the stake to which the trap is secured. These walls may also take the shape of ring segments. In order to assure better fit of the trap walls to horse chestnut tree trunks of various circumferences, the catching part may—at least in part—be structures like an accordion. Convex triangular surfaces, and the individual ring sections are permanently connected using accordion hinges 758. The sides of the clod of the catching part are fastened by two walls, shaped as oblong rectangles, that are simultaneously the external sides of the external wedges, that are the part of the clod, which is a part of a catching part, to which the collar 757, directing the insects, is adjoined. The upper wall 759 contains mini-funnels, in the form of tapering hollows ending in openings, through which the insects may enter the catching part interior. It is important that the surface of the base of the mini-funnel lay in the surface of the main wall of catching part, and the edges of the mini-funnels doesn't protrude above it. The mini-funnels should be located as near as it's possible to the shorter, inner edge of the upper wall, preferably when they encircle in ¼ or ⅓ width of the inner main wall. Then the mini-funnels fit close to the trunk, and they will be the best bridge between the trunk and the interior of the trap. The mini-funnels 755 can also be situated, spaced out every 10-12 mm, on the external triangular wall of each wedge that form the catching part.

A variation on this solution may include, instead of individual mini-funnels 755, a funnel-gutter with the spacing of walls at the top equal to the diameter of the mini-funnel's inlet opening, and at the bottom to the diameter of the mini-funnel's outlet opening. The depth of the gutter should be approximate to the depth of the mini-funnel 755. The gutter, or the mini-funnels 755, should be oriented with the narrower opening facing down towards the interior of the container of the catching part 753.

Most of the inlet openings of neighboring mini-funnels 755 are connected with rectangular clamps 756. They are preferably made of 1 mm thick wire, with side arms about 2 mm longer than the depth of the mini-funnels 755. Due to the fact that these pest butterflies like to walk along the edges of objects, these buckles are meant to intercept the insects roving on the surface of the trap, and direct them to its interior. Similar clamps also connect the external edge of the ring section with mini-funnels 755 situated on its surface. They are also meant to "intercept" insects moving along its upper surface, which is the surface located closest to the bark surface, and in that the most catch able surface of the trap. It's inside edge should be as flush with the tree trunk as possible, thus for older trees, with thick bark, it is advisable to level the trunk at the spot the trap edge to come into better contact with. With regard to relation between the behavior of the insect connected with direction of blowing wind, the catching part 753 may encircle only the part of a trunk. Because of the practical reasons, in case of the horse-chestnuts with large circuits, it is advisable for the two outermost mini-funnels in the base of the trap come into contact with the peaked lower ends of collars, situated at an angle in relation to vertical axis of the tree trunk.

It is advisable, that the inner side of the inner main wall, and also inner sides of the directing device walls, have the folding or tiling structure.

FIG. 20 presents an insect trap, consisting of a catching part 763, made up of cuboids connected by one of their walls, and radiating from the center of the trap. The trap consists of two crossing, in its middle part, cuboids, which bottom walls are slopping to the middle of the trap—at about 40-45 degrees. On the side walls of the cuboids there are mini-funnels 764, which outlets are situated in the interior of the catching part. The cuboids, forming the catching part, devolve into a device 768 directing the insects onto an element separating them from water and small debris. The catching part is connected with the catching container 766 through a connective element 769.

To achieve better results, it is advisable, that the external edges of the cuboids, at least partially, are connected with the most neighboring mini-funnels, using directing buckles, likewise in case of the trunk trap. This kind of buckles should also join the nearest mini-funnels, by arranging the buckles in fir's shape.

FIG. 21 presents an insect trap made up of a catching part 775—with a shape reminiscent of a parallelepiped, with walls containing mini-funnels 774, directing device 773, joining element 778 and a container 771 for storing the caught insects, that is equipped with a drainage device 779. In one variation of the catching part, its side walls form hollows in the shape of a truncated pyramid, with the inlet opening in the center. The catching part has on its bottom a directing element 773, the lower end of which is located over the trap's separating device, and the upper end connects to the parallelepiped element. The inner walls of the trap may be covered with folding or tiling structure.

Figure 22:
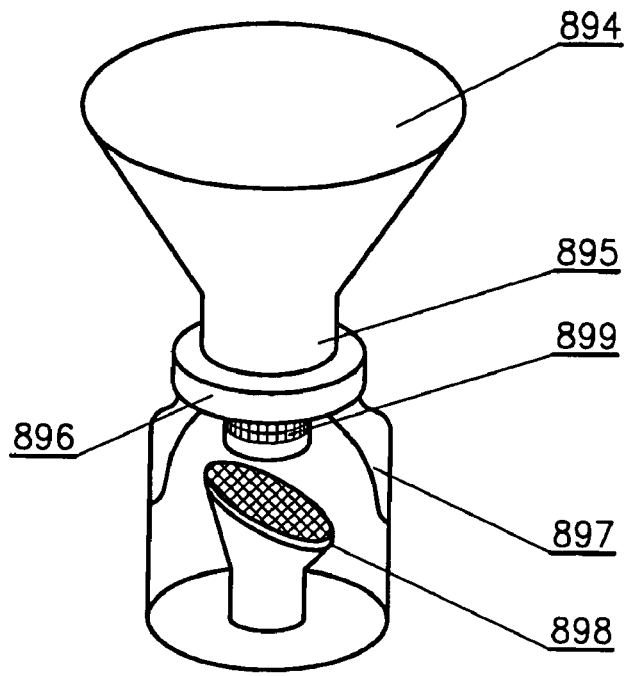
FIG. 22 shows a funnel-type trap.

The trap shown in FIG. 22 consists of a catching part 894, a catching container 897 for storing the caught insects, a connective element 896, and a funnel 895 directing the insects onto a separating-draining device 898, which is integral to the catching container 897. In the bottom part of the device directing the insects, there is a container 899, designed for larger dirt, which gather in it, that's why they don't clog the small openings of the drainage device 898. The container 899, designed for larger dirt, is situated above the drainage device 898, which separates the insects from water and small debris.

Figure 23:
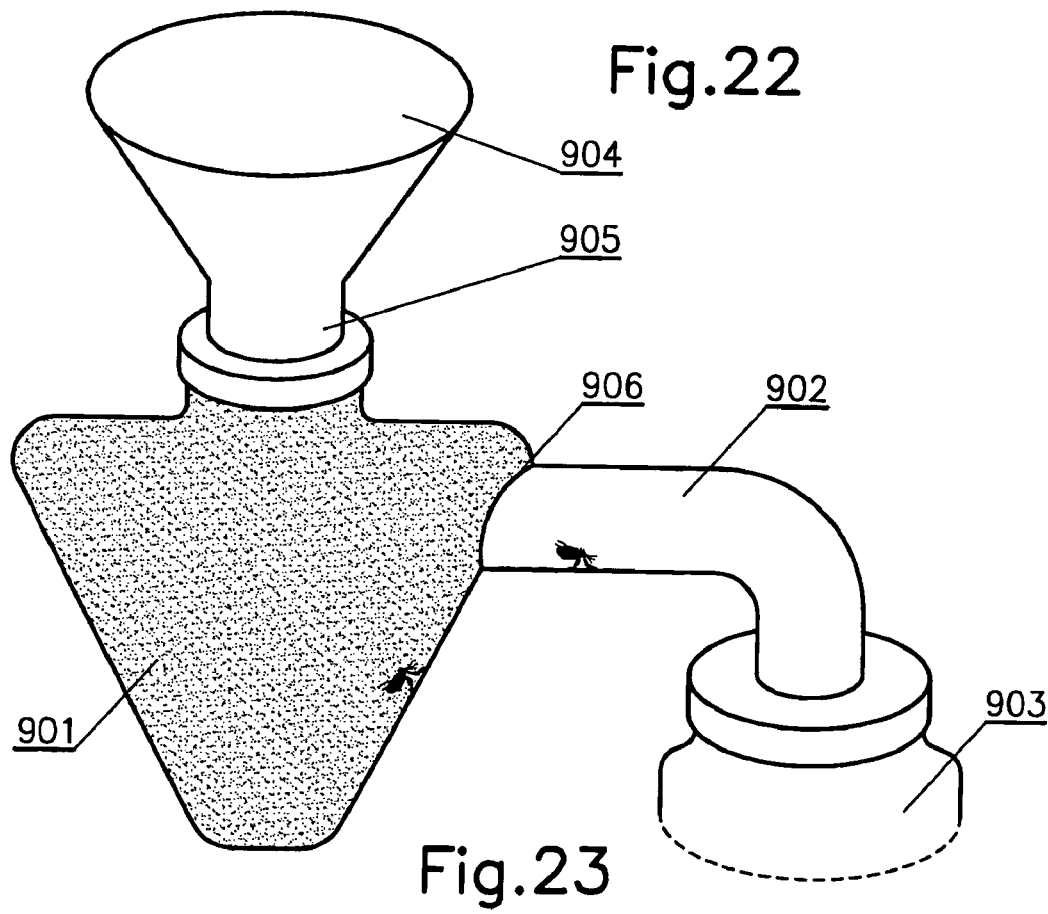
FIG. 23 shows a trap with an additional separating container.

In yet further embodiment shown in FIG. 23, the drainage device is an additional container 901, that has the shape of inversed and closed cone or pyramid, or a clod with the walls made of dark material, penetrable by the water and steam and not penetrable by the light. The additional container 901 is joined with the catching part 904, which is equipped with a directing device 905. All the dirt, insects, as well as water may fall into the additional container. In the upper part of the container there is an opening 903, which leads to the container 903 for storing the caught insects. The walls of the container 903 for storing the caught insects and the walls of connective tube 902, are transparent, thanks to this, the insects which fell down, through the upper opening, to the interior of a dark additional container 901, direct along the slopping walls to the brighter part of the separating device. This is caused by the phototropic effect. From that part of the container, they are penetrating through the opening 906 and connector or connective tube 902, to the container 903 for storing the caught insects, which is filled with the conserving liquid.

The presented solutions show a perfected method for draining precipitation water—which enters the interior of a trap—through redesigning the container for storing the captured insects. Protecting the container from periodical flooding by precipitation water, allows changing the method of storing the captured insects by introducing an attracting-conserving liquid. The drainage system applied in drawer-type containers, has the form of an oblong double wall, with an empty space between these walls. The upper parts of these walls are folded outwards. In order to assure the proper slope of the mesh, one of the oblong walls is higher than the other. The mesh stretched over the top parts of the walls, is thus situated at an angle to the bottom of the container. The insects falling into the container through the oblong narrowing in the bottom of the catching part, bounce off the diagonally placed mesh, and fall into the attracting-conserving liquid filling the container. They may remain there for up to a few months, without the need to remove them. Proper drainage of the container prevents the diluting of the applied liquid. The constancy of its composition, as well as the presence of detergent, causes the insects to quickly sink. They are thus unable to release pheromones, or emit warning signals. The insects in the liquid do not decay, and thus do not attract scavenging insects. In order to prevent the liquid from spilling from a flat drawer, it may be triangular in cross-section. It may also contain barriers, located at preset intervals. These improvements assure that water entering the trap during rainfall does not enter into the container storing the captured insects, where it would dilute the liquid.

With methods currently in use during the insect season (about 5 months), the traps need to be serviced some dozen or more times in a single season. The greatest benefit of using the presented method during catch-off, is that there is no need to empty the traps during the season, which facilitates observation, as well as reduces the work load and expenses involved in servicing the traps. Furthermore the quick sinking of the captured insects, and the stalling of decay, causes that the insects approaching the traps are not frightened off, which improves the effectiveness of the catch-off.

Uniform conservation does away with the need to count each batch of captured insects individually. The scale incorporated into the wall of the container allows determining the number of pests fairly accurately—during, and at the end of the observation season—without the need of removing and laboriously counting the captured wood worms.

Considerable savings in time and expenses involved, allow for increasing the number of traps set in the field, even in remote or hard to get locations, which is currently unfeasible. This should serve to improve sanitation, and decrease the damage caused by the insects.

The method for catching insects using traps according to the present invention is in itself not complicated. The traps are set up prior to the expected start of the insect season. The insects enter the trap, next fall through the narrowing of the reducer onto a mesh, from where they slide into the container filled with the attracting-conserving liquid.

The trap, which is the subject of the present invention, may be utilized in forestry, orchardy, and wherever pheromone, or other insect traps are used. Thanks to the application of the attracting-conserving liquid, the effect of frightening off (through anti-pheromones, scent of decay, striudulative sounds) of approaching insects is done away with, which serves to improve the catch-off. The greatest benefit is the lack of need for frequent control and servicing related with emptying the containers.

The invention claimed is:

1. A trap for catching woodland, garden, and agricultural insect pests, comprising a catching part with an outlet opening, and a container for storing caught pests, characterized in that a device for separating the captured pests from water and small debris is placed on a caught pests movement path extending from the outlet opening of the catching part to the container; wherein the device for separating the captured pests from water and small debris has a shape of a funnel having a funnel inlet covered up by a mesh and a funnel outlet situated outside of the container so that water and small debris may flow out of the funnel outlet and wherein the funnel inlet is placed between the outlet opening of the catching part and the container; and wherein the funnel is truncated diagonally so that the pests, which have fallen into the container, slide down the mesh covering the funnel inlet and fall into a chamber, formed by a wall of the funnel, a ring-shaped part of the container and by its side walls.

2. The trap according to claim 1 wherein the device for separating the captured pests from water and small debris is placed between the outlet opening of the catching part and the container.

3. The trap according to claim 1 wherein the mesh is made from a hydrophobic material.

4. A method for catching woodland, garden, and agricultural insect pests, using a trap comprising a catching part and a container for storing the captured insects characterized in that the trap with a device separating the captured pests from water and small debris, placed on a path along which the caught pests move, is hung with a bottom of the container for storing the caught insects being in horizontal position; wherein the device for separating the captured pests from water and small debris has a shape of a funnel having a funnel inlet covered up by a mesh and a funnel outlet situated outside of the container so that water and small debris may flow out of the funnel outlet and wherein the funnel inlet is placed between the outlet opening of the catching part and the container; and wherein the funnel is truncated diagonally so that the pests, which have fallen into the container, slide down the mesh covering the funnel inlet and fall into a chamber, formed by a wall of the funnel, a ring-shaped part of the container and by its side walls.

5. The method for catching insect pests according to claim 4 wherein the device separating the captured insects from water and small debris is placed between the outlet opening of the catching part, and the container where the captured pests are stored.

6. The method for catching insect pests according to claim 4 wherein the outlet opening of the catching part is directed towards the device for separating the captured insects from water and small debris using a directing device.

* * * * *

UNITED STATES PATENT AND TRADEMARK OFFICE
CERTIFICATE OF CORRECTION

PATENT NO.       : 7,669,362 B2
APPLICATION NO.  : 10/566449
DATED            : March 2, 2010
INVENTOR(S)      : Leszek Cwiklinski and Andrzej Barczyk It is certified that error appears in the above-identified patent and that said Letters Patent is hereby corrected as shown below:

Title Page, Item (75) Inventors:

City of residence for Inventor Leszek Cwiklinski should be changed from "Cracow" to --Krakow--.

Signed and Sealed this

Twenty-fourth Day of August, 2010

David J. Kappos
*Director of the United States Patent and Trademark Office*